July 21, 1936. G. PERVELIS 2,048,620
HEAT CONTROL
Filed Oct. 10, 1934 2 Sheets-Sheet 1

WITNESSES

INVENTOR
Gregory Pervelis
BY
Munn, Anderson & Liddy
ATTORNEYS

July 21, 1936.     G. PERVELIS     2,048,620
HEAT CONTROL
Filed Oct. 10, 1934     2 Sheets-Sheet 2.
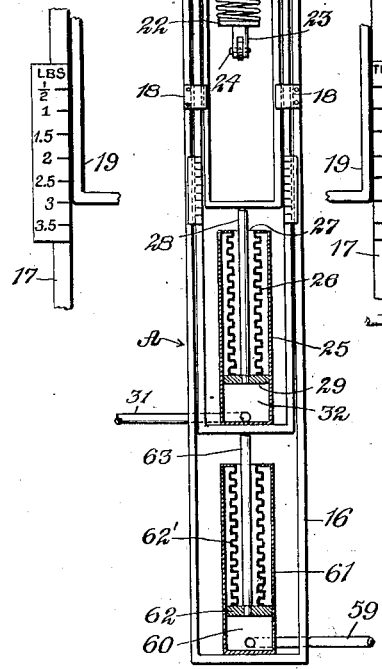
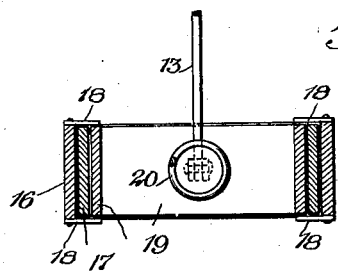
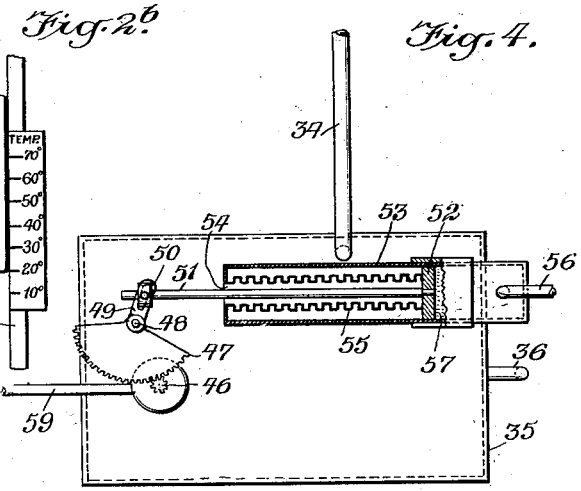
WITNESSES
INVENTOR
Gregory Pervelis
BY
ATTORNEYS Patented July 21, 1936

2,048,620

UNITED STATES PATENT OFFICE 2,048,620

HEAT CONTROL

Gregory Pervelis, New York, N. Y.

Application October 10, 1934, Serial No. 747,775

10 Claims. (Cl. 236—91)

This invention relates to a control for heating systems and generally known as the type of heat controls wherein the parts automatically function to maintain a given temperature.

An object of the invention is to provide a heat control wherein the steam controlling mechanism is caused to function in proportion to the action of thermostats arranged exterior of the building being heated.

Another object of the invention is to provide a heat control wherein outside thermostats are used, and so correlated with the heating system that two controls are provided for varying the amount of steam utilized; one involving a control actuated by an outside thermometer and the heat of return water, and the other actuated by an outside thermometer alone.

A further object of the invention more specifically is to provide in a heating system having a reducing valve, a plurality of means for causing said reducing valve to open and close according to the variation in temperature exterior of the building so that the amount of steam supplied to the heating units will vary with the variation in temperature exterior of the building.

In the accompanying drawings—

Figure 1 is a view partly in section and partly in elevation, forming a diagram illustrating a heating system with the control embodying the invention associated therewith;

Fig. 2 is an elevation of a reducing valve regulator; Fig. 2a is a fragmentary elevation on an enlarged scale of an aggregation of associated parts illustrated in Fig. 2; Fig. 2b is an enlarged fragmentary elevation of a second aggregation as shown in Fig. 2;

Fig. 3 is a transverse section through Fig. 2 on the line 3—3, the same being on an enlarged scale;

Fig. 4 is an enlarged view partly in section and partly in top plan, of one of the controlling units shown in Fig. 1.

Figure 1:
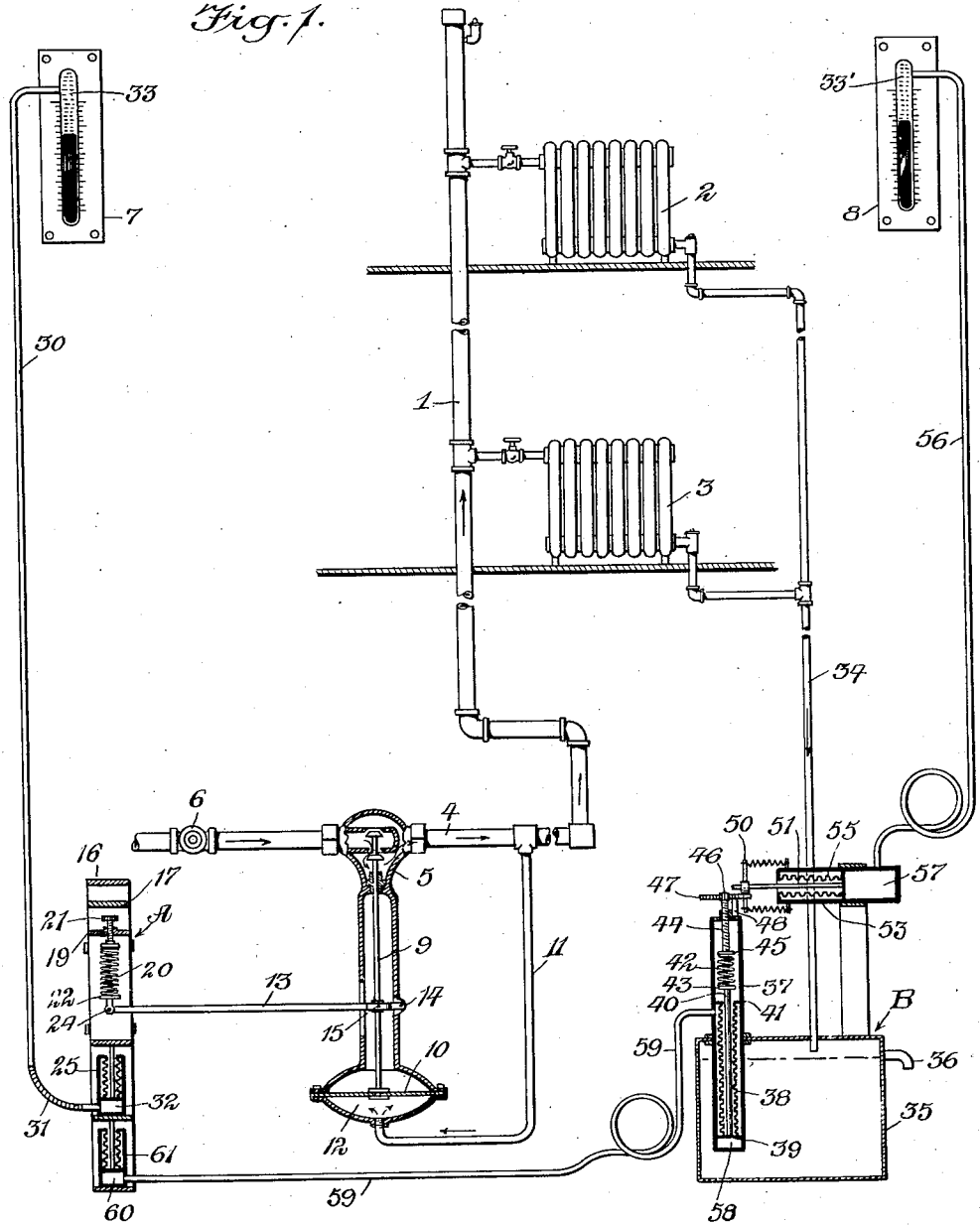

Referring to the accompanying drawings by numerals, 1 indicates a steam supply pipe to which radiators 2 and 3 are connected, said supply pipe 1 being connected with a steam supply pipe 4 in which a reducing valve 5 is interposed. A valve 6 is also arranged in the pipe 4 so as to completely turn off the supply of steam whenever desired. The various parts just described form a heating system which is a standard kind and forms no part of the present invention except in combination.

In various heating systems now in use, steam is supplied from a suitable source, as, for instance, a furnace in the building or from the street, the steam passing through the valve 6, for instance, and then through the reducing valve 5 and into the supply pipe 1 from which it is distributed to the various radiators. Heretofore various means have been used to control, as far as possible, the use of the steam, but in the thermometers and other devices used various difficulties have arisen and quite often it has been found that more steam than is necessary is used and the return water is much hotter than it should be, thus indicating that more steam is supplied than necessary for the desired purpose.

In the construction shown in Fig. 1, means have been provided and connected with the standard heating arrangement just described, whereby two outside thermostats or thermometers, as 7 and 8, are used, connected up with the system in such a way that there will be two controls, one directly for the steam according to the rise and fall of the temperature outside of the building, and the other associated with the return water for varying the amount of steam according to the heat of the return water in connection with the temperature outside of the building. The reducing valve 5 may be of a standard kind and provided with a rod 9 connected to a diaphragm 10 so that steam passing through the by-pass 11 will fill the lower chamber 12 and give the diaphragm 10 and rod a continual tendency to move up and close the valve. A lever 13 is pivotally mounted at 14 and is connected at 15 with the rod 9 so that as the lever 13 moves up and down the rod 9 will move up and down and any upward movement of the rod 9 caused by steam pressure in the chamber 12 will swing the lever 13 upwardly. In many heating systems now in use this arrangement is used, but a weight is provided on the lever 13 and the weight is shifted back and forth according to the amount of steam desired. When the weather outside changes some person must move the weight or otherwise there will not be provided the desired steam.

In the present invention means have been provided for automatically varying the action of the lever 13 according to the change in temperature outside of the building, so that when it gets colder the parts will be so moved that more steam will be allowed to pass and, consequently, the temperature in the building will remain constant. If the temperature outside becomes warmer, the control will function to move the lever 13 so as to close the valve 5 more or less and thus supply a less amount of steam, and in this way maintain the same temperature as heretofore. A double control arrangement is provided for the actuation of the lever 13, one being what may be termed a primary control unit A and the other a secondary control unit B.

Referring more particularly to the primary control unit A, attention is called to Fig. 2, wherein it will be seen that there is provided a frame or casing 16, which is stationary and which is secured to a wall or other support by brackets or in any other desired manner. Arranged within the frame or casing 16 is a sliding rectangular frame 17 guided by suitable overlapping plates 18. It will be understood that the frame 17 is freely movable when not prevented for some reason and, consequently, gravity acting continually thereon will maintain the same in as low a position as possible, the parts being arranged vertically so that the movement of the frame 17 will be up and down in a vertical direction. Arranged within the frame 17 is an auxiliary frame 19 which is freely slidable in the frame 17 subject to the action of gravity, rod 28 and other parts hereinafter fully described. The frame 19, together with a spring 20 and adjusting screw 21, acts as a weight for the lever 13, the lower part of the spring 20 carrying a plate 22 having a bifurcated extension 23 straddling the end of lever 13 so that a pivotal pin 24 may extend therethrough and through the lever 13. The weight of the parts just described if resting fully on lever 13, would prevent the same from rising, notwithstanding any steam that might be forced into the chamber 12. In fact the weight of the frame 19 is sufficient to prevent the raising of the lever 13, but by using the spring 20 this lever may be raised and lowered under these circumstances. As shown in Fig. 2, the rods 28 and 63 support the frames 19 and 17, respectively, and by reason of the screw 21 the spring 20 is brought under the desired tension. When the device is first installed the valve 5 is fully opened, assuming there is no steam in the chamber 12. As soon as the steam in chamber 12 is turned on, the lever 13 will be moved upwardly somewhat and the spring 20 compressed more or less. This will close the valve to a certain extent and by adjusting the spring 21 the amount of closure may be varied until the entire control is properly set. After this has been done, the parts will function properly and a certain amount of steam will flow until the temperature outside rises or falls. If the temperature outside falls then the rod 28 will move downwardly and, consequently, frame 19 will move downwardly and thereby bring spring 20 under more tension. This will result in moving the lever downwardly somewhat and, consequently, cause the valve 5 to open further.

As shown in Fig. 2, there is provided a cylinder 25 secured to the bottom of the frame 17 and, consequently, moves up and down therewith. The cylinder 25 is provided with a bellows 26 which is of the accordion pleated type, said bellows being open at 27 so that the rod 28 may extend therethrough, said rod being rigidly secured to a member 29 which acts as a piston and slides back and forth in the cylinder 25, said piston closing one end of the bellows 26. The thermostat 7 may be of any desired type, and the upper end is in free communication with a small pipe 30, which pipe has a flexible section 31 near the lower end where it enters the chamber 32 of the cylinder 25. A liquid 33 fills the upper part of the thermostat 7 and also the pipe 30 and chamber 33. This liquid may be of any desired kind as, for instance, a preferred form of hydrocarbon oil, such as fuel oil or kerosene. Whenever the temperature rises on the outside of the building, the mercury in the thermostat or thermometer rises and forces some of the liquid 33 through pipe 30 into chamber 32 and, consequently, forces the piston 29 and rod 28 upwardly, thus causing rod 28 to push the frame 19 upwardly in proportion to the rise in temperature outside of the building. This upward movement will result in taking some of the tension off the lever 13, which will consequently move upwardly and will cause valve 5 to close to a certain extent. When the temperature outside falls, the mercury or other thermostat member of the thermometer will move downwardly and, consequently, the weight of the frame 19 and associated parts will be sufficient to cause the piston 29 to force some of the liquid back into pipe 30 and also back into the thermostat, thus allowing the frame 19 to move downwardly under the action of gravity and thereby compress the spring 20 which will in turn move lever 13 downwardly which will cause the valve 5 to open in a proportionate manner.

By reason of this structure and this action, as the temperature rises and falls exterior of the building, frame 19, which is really the weight on lever 13, will rise and fall and will thereby open and close the valve 5, so that a greater or less amount of steam is admitted in order that the temperature in the interior of the building may remain constant. The spring 20 provides a yielding action which causes lever 13 to be sensitive and also permits the adjusting screw 21 to be adjusted when the parts are being installed and set into functioning position. If it is found after the system has been installed that too much or too little steam is supplied, a proper adjustment of the screw 21 may be made without touching any of the other parts and this will cause an increase or decrease of steam.

The structure just described provides for a constant temperature, but in order to make the control more exact, control unit B is provided which functions in connection with the thermostat or thermometer 8 and the return water from the radiators, as shown in Fig. 1, the return water from the radiators passing down through pipes 34 into a container 35 which has an outlet or overflow pipe 36. The water passing through the pipe 36 may be directed to the sewer or may be utilized for initially heating water or for any other purpose. However, the water in the container 35 is designed to be at a certain temperature and if it should rise above this temperature certain actions of the control unit will take place for shutting off some of the steam by closing valve 5 a certain extent. A cylinder 37 extends into the container 35 preferably from the top with the lower portion nearer the bottom of the container 35, said cylinder being substantially steam-tight and carrying a bellows 38 of accordion pleated type, said bellows having a member 39 at the inner end for closing the same. A rod 40 is connected with the member 39 and extends through the open end 41 of the bellows so as to press against the spring 42, there being an enlarged portion 43 engaging the spring. A screw 44 has an enlarged end 45 engaging the upper end of the spring 42, said screw extending through the upper end of the cylinder 37. A pinion 46, as shown in Fig. 4, is connected to the upper end of the screw 45, and a rack 47 continuously meshes with this pinion. The rack 47 is pivotally mounted at 48 on a suitable support and is provided with a slotted arm 49 into which a pin 50 extends, said pin being carried by the rod 51 so that whenever rod 51 moves in either direction, rack 47 will be moved accordingly and screw 48 will be rotated in one direction or the other. The rod 51 is connected to a piston 52 slidably mounted in a cylinder 53, which is closed except for the opening 54, said opening being also the opening of the accordion pleated bellows 55 which has one end rigidly secured to piston 52. The thermostat 8 is preferably of the same type as thermostat 7 and the liquid 33' therein is preferably the same, said liquid also filling the pipe 56 which pipe is connected to its lower end with the chamber 57 of cylinder 53, whereby as the thermostat 8 functions the liquid will be moved into and out of chamber 57 and, consequently, will reciprocate the rod 51 and associated parts. For instance, if the temperature rises outside of the building, more of the liquid 33' will enter chamber 57 and, consequently, the rod 51 will be moved in a certain direction. It will also be seen from Fig. 1 that the chamber 58 is a closed chamber but is in free communication with a pipe 59, which pipe is in free communication with the chamber 60 of the cylinder 61. The cylinder 61 is identical in structure with the cylinder 25 and is provided with a piston 62 having a rod 63 contacting with the lower end of the frame 17.

When the water in the container 35 rises above a given point, it acts to expand the liquid in chamber 58, which liquid may be any desired form of hydrocarbon oil the same kind as liquid 33. For instance, if the thermostat 7 is not moving up or down and the parts are set so that the temperature of the water in container 35 is to be 110° and the temperature of the return water should rise to 140°, such rise in temperature will cause the liquid in chamber 58 to expand and, consequently, more of this liquid be forced into chamber 60 of control unit A, whereupon piston 62 and rod 63 will be raised so that the frame 17 will be moved upwardly and as this moves upwardly the rod 28 and associated parts will be moved upwardly and move the frame 19 upwardly, thus relieving the lever 13 of some of its weight and thereby permitting the steam pressure in chamber 12 of the reducing valve to close the valve to a proportionate extent. In this way the thermostat 7 holds the rod 28 and associated parts in a certain position, but if this allows too much heat the piston 62 and associated parts will function to shut off some of the steam. This action of the expansion of the liquid in chamber 58 is regulated by the action of the thermostat or thermometer 8. For instance, if the temperature of the water in the container 35 is correct and the temperature of the atmosphere exterior of the building adjacent the thermometer 8 rises, the rod 51 will be moved to the left, as shown in Fig. 4, and the various parts caused to function as heretofore described, whereby screw 44 will be screwed downwardly and the tension on spring 52 will be increased so that the rod 40 will be moved downwardly and the bellows 38 be caused to expand, whereby some of the liquid in the chamber 58 will be forced over into chamber 60 and cause piston 62 and rod 63 to be moved upwardly, thus permitting lever 13 to swing upwardly as heretofore described. In this way the thermometer 8 augments thermometer 7 in influencing lever 13, and in addition the temperature of the water in container 35 when it is raised beyond a certain point will also influence the lever 13 as just described, to cause a slight closing action of the valve 5. It will also be observed that when the parts are set as described and the temperature outside of the building should decrease the thermostat will cause the liquid in chamber 57 to move up somewhat which will result in the rod moving to the right as shown in Fig. 1. This will cause screw 44 to rotate in a direction to relieve spring 42, whereupon bellows 38 will contract a proportional amount and raise member 39 upwardly which will result in drawing liquid from chamber 60 through line 59 into chamber 58. When this occurs the set temperature of 110° F. as above mentioned is not sufficient to expand the liquid in chamber 58 sufficiently to cause the raising of piston 62 and associated parts. This will allow the weight to open the valve 5 to permit additional steam to enter the system. This additional steam continues to enter the system until the return water is hotter than the set figure of 110° F. If the cold outside of the building continues, the temperature of the return water in container 35 will be maintained higher than 110° F. until the temperature outside the building is lowered, whereupon it will be brought back to the temperature fixed, namely, 110° F. The movement of the thermostat 8 will regulate the position of the member 39 and, consequently, the temperature of the return water will go up and down with the outside temperature but never go below 110° F. if the system is so set. In this way a greater volume of steam is automatically supplied to the heating system in extreme cold weather and less in moderate weather so that the radiators may be hotter in extreme cold weather than in moderate weather, whereby the temperature of the rooms in the building will remain substantially constant. The thermostat 7 acts in a manner to close or partly close valve 5, while the temperature of the water and the action of the thermostat 8 acting independently secure the same or additional results in the same direction. It will be noted that these members in a certain sense produce a distinct closing as these members, in effect, take the weight from lever 13 and in this way allow the steam chamber 12 to produce a closing action. The opening action of valve 5 is produced by the weight of the sliding frame 19 and associated parts, and this frame is allowed to drop down under the action of gravity when the mercury or other thermostatic member in the thermometers 7 and 8 moves downwardly. The weight of the frames 17 and 19 continually acts on the rods 63 and 28 so as to give them a continuous tendency to expand the respective bellows 55 and 26. It will therefore be seen that the weight of the two sliding frames acts to produce a return flow of the liquid, and the sliding frame 18 also acts as a weight which varies its action according to the movement of the liquid 33 or 33', or the liquid in the chamber 58.

I claim:

1. A heat control for a steam heating system for a building, said system having a reducing valve provided with a control member, a weight connected with said control member, a thermostat structure subject to the temperature exterior of said building for raising said weight and a second thermostatic structure caused to function by the temperature of the return water from said heating system acting independently of the first-mentioned thermostatic structure, for raising said weight.

2. A heat control for a steam heating system for a building, said system including a reducing valve having a member for opening and closing the valve, a weight connected with said member acting to open the valve, and a plurality of independent means for raising said weight, said means including a thermostat structure subject to the temperature exterior of said building for raising said weight, and a second thermostat structure responsive to the action of the return water from said heating system acting independently to raise said weight and a third thermostatic structure responsive to the temperature of the air exteriorly of the building acting to vary the action of said second thermostatic structure.

3. A heat control for steam heating systems provided with a reducing valve having an actuating member for opening and closing said valve, a weight acting on said actuating member for moving the same whereby the actuating member will open said reducing valve, a thermostat structure responsive to the temperature exteriorly of the building using the system for raising said weight and said actuating member for closing said reducing valve, said thermostat structure including a piston rod engaging said weight and a piston for moving said piston rod upwardly, and a second thermostat structure responsive to the temperature of the return water of the heating system acting independently of the first-mentioned thermostat structure for raising said piston and piston rod upwardly as a unit.

4. A heat control for a steam heating system for a building including a reducing valve for regulating the steam entering said system, means for closing said valve, a weight for moving said valve to an open position, a thermostat structure subjected to the temperature exterior of the building acting to raise said weight for permitting said valve to move toward a closed position in proportion to the action of the thermostat, an auxiliary means for raising said weight independently of said thermostat structure, said auxiliary means including means utilizing the temperature of the return water from the heating system for modifying the action of the said thermostat, and an auxiliary thermostat responsive to the temperature exteriorly of said building acting to cause said last-mentioned means to function at various temperatures according to the action of said auxiliary thermostat.

5. A heat control for a steam heating system provided with a reducing valve having a control lever for opening and closing said valve, a weight connected with said lever acting to open said valve, a plurality of thermostats one of said thermostats being responsive to the temperature of the return water from the heating system and the remaining thermostats being responsive to the temperature of the air exteriorly of the building using the heating system, a control mechanism actuated by the thermostat responsive to the temperature of the return water and also by one of the remaining thermostats for raising said weight and lever for closing said valve, said weight moving downwardly under the action of gravity when the control mechanism permits, the various control means modifying the action of each other according to the action of the respective thermostats.

6. A heat control for a steam heating system provided with a reducing valve having an actuating member for opening and closing the same, means functioning as a weight connected with said actuating member, said means moving downwardly under the action of gravity when permitted to open said valve, a piston rod engaging said weight at the lower end of the weight, a thermostat including a piston for moving said weight upwardly, a cylinder surrounding said piston and part of said piston rod, a pipe extending from the lower end of said cylinder and a liquid filling for said pipe and for that part of said cylinder adjacent said piston whereby when the liquid expands some will be forced in said cylinder and cause said piston and piston rod to move upwardly and raise said weight, a vertically slidable member secured to said cylinder and acting as a support therefor, a second piston rod engaging the lower part of said vertically sliding member, said second thermostat including a second piston connected to said second piston rod, a second cylinder surrounding said second piston and part of the second piston rod, a third cylinder, a pipe providing communication between the lower part of said second cylinder and the upper part of said third cylinder and a liquid filling said last-mentioned pipe, said third cylinder and that part of the second cylinder adjacent the second piston and an expansible member responsive to the temperature of the return water of the heating system, whereby when the expansible member of the third cylinder expands some of the last-mentioned liquid will be forced into the second cylinder for moving said second rod upwardly and said upward movement of said second piston rod acting to move said support and the first-mentioned cylinder with his piston rod and associated parts upwardly as a unit and thereby giving an upward movement to said weight through the action of the second thermostat.

7. A heat control for a steam heating system for a building, said steam heating system being provided with a reducing valve having a control member, a weight connected with said control member for moving the control member, a primary thermostat responsive to the temperature exteriorly of said building, an auxiliary thermostat responsive to the temperature exteriorly of said building and a third thermostat responsive to the temperature of the return water of said heating system, means actuated by the first-mentioned thermostat for independently moving said weight upwardly, means actuated by a third thermostat for independently moving the first-mentioned means and weight upwardly and means actuated by said auxiliary thermostat for varying the action of a third thermostat.

8. A heat control for a steam heating system for a building including means for varying the amount of steam utilized, a primary thermostat exteriorly of said building independently varying the action of said means, a second thermostat actuated by the temperature of the return water when the same is above a certain temperature for independently varying the action of said means and for varying the action of said primary thermostat, and a third thermostat exposed to atmosphere exteriorly of the building for varying the action of said second thermostat.

9. A heat control for a steam heating system for a building, said control including a pressure reducing valve, valve actuating means for positively moving said reducing valve toward and from a closed position, a weight for actuating said valve actuating means to open said reducing valve, a thermostat positioned exteriorly of said building for moving said valve actuating means to close said reducing valve, and an auxiliary thermostat utilizing the temperature of the return water from the heating system for independently moving said valve actuating means so that said reducing valve will move toward a closed position when the return water has a temperature above a given point.

10. A heat control for a steam heated building including a pressure reducing valve for varying the amount of steam utilized according to the rise and fall of temperature exteriorly of said building, means for opening said valve, a primary thermostat actuated by the temperature of the return water from said heating system for moving said valve toward a closed position, and an auxiliary thermostat responsive to the temperature exteriorly of the building acting to reset said primary thermostat automatically as the temperature exteriorly of the building rises and falls for causing said primary thermostat to close more and more as the temperature exteriorly of the building rises and to allow said valve to open more and more as the temperature exteriorly of the building falls, whereby more and more steam is allowed to enter the heating system as the temperature exteriorly of the building falls and less and less steam is allowed to enter the heating system as the temperature exteriorly of the building rises.

GREGORY PERVELIS.